US010975290B2

(12) United States Patent
Favero et al.

(10) Patent No.: US 10,975,290 B2
(45) Date of Patent: Apr. 13, 2021

(54) METHOD OF TREATING A PORTION OF A SUBTERRANEAN FORMATION WITH IMPROVED WATER IN OIL EMULSION

(71) Applicant: S.P.C.M. SA, Boutheon (FR)

(72) Inventors: Cédrick Favero, Boutheon (FR); Bruno Tavernier, Boutheon (FR)

(73) Assignee: S.P.C.M. SA, Andrezieux Boutheon (FR)

( * ) Notice: Subject to any disclaimer, the term of this patent is extended or adjusted under 35 U.S.C. 154(b) by 0 days.

(21) Appl. No.: 16/523,249

(22) Filed: Jul. 26, 2019

(65) Prior Publication Data

US 2020/0040252 A1 Feb. 6, 2020

(30) Foreign Application Priority Data

Aug. 3, 2018 (WO) .................. PCT/IB2018/000990

(51) Int. Cl.

*C09K 8/588* (2006.01)
*C09K 8/36* (2006.01)
*C09K 8/64* (2006.01)
*C09K 8/80* (2006.01)

(52) U.S. Cl.

CPC ................ *C09K 8/588* (2013.01); *C09K 8/36* (2013.01); *C09K 8/64* (2013.01); *C09K 8/80* (2013.01)

(58) Field of Classification Search

None
See application file for complete search history.

(56) References Cited

U.S. PATENT DOCUMENTS 8,383,560 B2 2/2013 Pich et al.
2014/0144643 A1 5/2014 Frederick et al.
2016/0017203 A1* 1/2016 Frederick ................ C09K 8/64 166/308.3
2017/0037299 A1* 2/2017 Li .......................... C09K 8/588
2018/0072935 A1 3/2018 Frederick et al.

FOREIGN PATENT DOCUMENTS

EP 0030425 A1 6/1981
WO 2016/109348 A1 7/2016
WO 2017/027319 A1 2/2017

OTHER PUBLICATIONS

International Search Report and Written Opinion of the International Searching Authority for PCT/IB2018/000990 dated Mar. 18, 2019.

Griffin, W.C., “Classification of Surface-Active Agents by HLB”, Journal of the Society of Cosmetic Chemists, pp. 311-326 (1949).

* cited by examiner

*Primary Examiner* — Jeffrey D Washville
(74) *Attorney, Agent, or Firm* — Heslin Rothenberg Farley & Mesiti P.C.

(57) ABSTRACT

Method of treating a portion of subterranean formation, comprising providing a water in oil emulsion of a water-soluble polymer, said emulsion comprising at least an inverting agent, and at least an emulsifying agent, wherein the mass ratio R of the total amount of inverting agent to the total amount of emulsifying agent is superior to 1.2, wherein the water in oil emulsion contains from 0.5% to 6% by weight of inverting agent;

inverting the water in oil emulsion by adding it into an aqueous fluid to form an injection fluid;

introducing the injection fluid into portion of the subterranean formation.

20 Claims, No Drawings

METHOD OF TREATING A PORTION OF A SUBTERRANEAN FORMATION WITH IMPROVED WATER IN OIL EMULSION

CROSS REFERENCE TO RELATED APPLICATION

This application claims priority to International Patent Application No. PCT/IB2018/000990, filed on Aug. 3, 2018. The entire contents of PCT/IB2018/000990 are hereby incorporated herein by reference.

FIELD OF THE INVENTION

The present invention relates to water-soluble polymers in water in oil emulsion for oil and gas field applications such as enhanced oil recovery and fracturing operations. More precisely, the present invention refers to a method for treating a portion of a subterranean formation and especially to a method for recovering oil and gas, wherein an optimized water in oil emulsion of water-soluble polymer is employed.

BACKGROUND

Water-soluble polymers are widely used in oil and gas recovery processes, such as enhanced oil recovery and fracturing operations, but also drilling operations or completion operations.

They may increase the viscosity of an aqueous fluid and/or reduce the level of frictional resistance that occurs during the injection of said fluid in a subterranean formation.

Water-in-oil emulsion is a well-known form of water-soluble polymer used in various industry, including the oil and gas industry. One of the advantages of water-in-oil emulsion is that it contains a relatively high proportion of polymer at a relatively low viscosity.

WO 2017/027319 discloses a water in oil latex and use thereof in the recovery of oil. This latex is added to an aqueous solution to afford a fluid that is injected into a subterranean formation. It might comprise 0 to 5 wt % of various additives. This document does not teach that the respective amounts of water in oil surfactant and oil in water surfactant of the latex should be adjusted as a function of the amount of salts of the injected fluid.

EP 0 030 425 discloses a water-soluble polymeric anti-precipitant and its injection into a subterranean formation. This document does not teach that the amount of surfactants should be adjusted as a function of the amount of salts of the injected fluid.

WO 2017/027319 and EP 0 030 425 do not teach using an emulsion having from 0.5 to 6 wt % of inverting agent and a mass ratio mass ratio inverting agent/emulsifying agent greater than 1.2.

One of the main challenges when using water in oil emulsion is to obtain an efficient and rapid effect of the polymer of the water-in-oil emulsion, particularly in high salinity brines when the salt (mono and/or divalent) concentration is high, or when the flow rate of the injection fluid is high, or when temperature of the fluid is low, or when shear rate applied to the fluid is low and little energy and mixing is provided to the emulsion, which is commonly the case in oil and gas recovery process.

Typically, polymers of the water-in-oil emulsion offers drag reducing and/or viscosifying effect, but may also offers flocculation and/or coagulation effects.

There is a need to improve the performances of the polymer of water in oil emulsion used in oil and gas recovery process. The applicant has discovered that by adjusting the surfactant package, the performances of the polymer of the water-in-oil emulsion are greatly improved, especially when the water in which the water-in-oil is mixed contains salts.

SUMMARY OF THE INVENTION

The invention relates to a method of treating a portion of subterranean formation by using a water in oil emulsion of water-soluble polymer, wherein the water in oil emulsion has a specific ratio of inverting agent to the emulsifying agent.

Treating a portion of a subterranean formation includes treating part of the subterranean formation or treating the entire subterranean formation.

More precisely, the present invention relates to a method of treating a portion of subterranean formation, comprising:

a. Providing a water in oil emulsion of at least one water-soluble polymer, said emulsion comprising at least an inverting agent, and at least an emulsifying agent, wherein the mass ratio R of the total amount of inverting agent to the total amount of emulsifying agent is superior to 1.2;
b. Inverting the water in oil emulsion by adding it into an aqueous fluid to form an injection fluid;
c. Introducing the injection fluid into portion of the subterranean formation.

DETAILED DESCRIPTION OF THE INVENTION

As used herein, the term "water-soluble polymer" refers to a polymer which gives an aqueous solution substantially without insoluble particles when appropriately mixed with water.

The mass ratio R is the ratio between the mass of inverting agent to the mass of emulsifying agent. When several inverting agents and/or several emulsifying agents are present in the water in oil emulsion, the mass of inverting agent is the sum of the mass of all the inverting agents present in the water in oil emulsion, and the mass of emulsifying agent is the sum of the mass of all the emulsifying agents present in the water in oil emulsion.

In the present invention, the term "emulsifying agent" refers to an agent which is able to emulsify water in oil, and an "inverting agent" to an agent which is able to emulsify oil in water. More precisely, it is considered that an inverting agent is a surfactant having a HLB superior or equal to 10, and an emulsifying agent is a surfactant having a HLB strictly inferior to 10.

Hydrophilic-Lipophilic Balance (HLB) of a chemical compound is a measure of the degree to which it is hydrophilic or lipophilic, determined by calculating values for the different regions of the molecule, as described by Griffin in 1949 (Griffin W C, *Classification of Surface Active Agents by HLB*, Journal of the Society of Cosmetic Chemists, 1949, 1, pages 311-326).

In the present invention, we adopted the method of Griffin based on calculating a value based on the chemical groups of the molecule. Griffin assigned a dimensionless number between 0 and 20 to give information on water and oil solubility. Substances with an HLB value of 10 are distributed between the two phases so that the hydrophilic group (Molecular mass Mh) projects completely into the water while the hydrophobic hydrocarbon group (Molecular mass Mp) is adsorbed in the non-aqueous phase.

The HLB value of a substance with a total molecular mass M, a hydrophilic portion of a molecular mass Mh and a hydrophobic portion of a molecular mass Mp is given by:

$$HLB=20(Mh/Mp)$$

It is essential to the invention that the mass ratio R is greater than to 1.2. In a preferred embodiment, the mass ratio R is superior to 1.5, more preferably superior to 1.8, more preferably superior to 2, even more preferably superior to 2.5, even more preferably superior to 3, even more preferably superior to 3.5, even more preferably superior to 4. In a preferred embodiment, the mass ratio R is inferior to 10.

In oil and gas processes, it is common to use brines (including synthetic brines, salted water and sea water) to invert the water in oil emulsion. Generally, when more salts are present in the aqueous fluid used to invert the water in oil emulsion, less efficient is the polymer of the water in oil emulsion. It is also the case when low shear is applied to make down the emulsion, and when the temperature of the fluid is low.

The selection of the specific ratio R is important in these "salted" conditions, and particularly important when the aqueous fluid comprises a high amount of salts, such as brines and high brines.

The brine may contain monovalent and/or polyvalent salts or combinations thereof. Examples of salts include without limitation sodium salts, lithium salts, potassium salts, magnesium salts, aluminum salts, ammonium salts, phosphate salts, sulfate salts, chloride salts, fluoride salts, citrate salts, acetate salts, tartrate salts, hydrogen phosphate salts, water soluble inorganic salts, other inorganic salts and mixtures thereof.

The brine preferably contains at least one of: sodium chloride, calcium chloride, sodium bromide, calcium bromide, zinc bromide, sodium formate and potassium formate.

The brine may contain more than 30.000 ppm of salts, preferably more than 70.000 ppm, even more preferably more than 100.000 ppm.

Unless otherwise stated, ppm are parts per million by weight.

According to a particularly preferred embodiment of the invention,

- when the aqueous fluid used to prepare the injection fluid with the emulsion is fresh water or a brine comprising up to 30.000 ppm (≤thirty thousand ppm) of salts, R ratio is above 1.2 (>1.2),
- when the aqueous fluid is a brine comprising from more than 30.000 ppm (>thirty thousand ppm) to 70.000 ppm (≤seventy thousand ppm) of salts, R ratio is above 1.8 (>1.8),
- when the aqueous fluid is a brine comprising from more than 70.000 ppm (>seventy thousand ppm) to 100.000 ppm (≤one hundred thousand ppm), R ratio is above 2 (>2),
- when the aqueous fluid is a brine comprising from more than 100.000 ppm (>one hundred thousand ppm) to 150.000 ppm (≤one hundred and fifty thousand ppm) of salts, R ratio is above 2.5 (>2.5),
- when the aqueous fluid is a brine comprising from more than 150.000 ppm (>one hundred and fifty thousand ppm) to 200.000 ppm (≤two hundred thousand ppm) of salts, R ratio is above 3 (>3),
- when the aqueous fluid is a brine comprising from more than 200.000 ppm (>two hundred thousand ppm) to 250.000 ppm (≤two hundred and fifty thousand ppm) of salts, R ratio is above 3.5 (>3.5), and
- when the aqueous fluid is a brine comprising more than 250.000 ppm (>two hundred and fifty thousand ppm) of salts, R ratio is above 4 (>4).

In a particularly more preferred embodiment,

- when the aqueous fluid used to prepare the injection fluid with the emulsion is fresh water or a brine comprising up to 30.000 ppm of salts, R ratio is above 2.5,
- when the aqueous fluid is a brine comprising from more than 30.000 ppm to 70.000 ppm of salts, R ratio is above 3,
- when the aqueous fluid is a brine comprising from more than 70.000 ppm to 100.000 ppm, R ratio is preferably above 3.5, preferably above 4,
- when the aqueous fluid is a brine comprising from more than 100.000 ppm to 150.000 ppm of salts, R ratio is above 4, preferably above 4.5,
- when the aqueous fluid is a brine comprising from more than 150.000 ppm to 200.000 ppm of salts, R ratio is above 4.2, preferably above 5,
- when the aqueous fluid is a brine comprising from more than 200.000 ppm to 250.000 ppm of salts, R ratio is above 4.5, preferably above 5.5, and
- when the aqueous fluid is a brine comprising more than 250.000 ppm of salts, R ratio is above 5, preferably above 6.

As already mentioned, the R ratio is less than 10.

In some embodiments, the aqueous fluid in which the water in oil emulsion is inverted contains a significant portion of divalent salts. More precisely, divalent salts preferably represent more than 8% by weight of the total weight of salts of the aqueous fluid, sometimes more than 21% by weight.

The selection of the ratio R is also important depending of the water in oil emulsion composition. It has been found surprisingly that the performances of the polymer of the water in oil emulsion are even more improved when the ratio R is selected according to the invention, and when the water in oil emulsion contains salts. In this case, the water-in-oil emulsion of the invention leads to very good performances, even in brines containing a substantial amount of salts.

According to a particularly preferred embodiment of the invention, the water in oil emulsion comprises from 1 to 40% by weight of salts, preferably from 3 to 30% by weight, more preferably from 5 to 25% by weight, even more preferably from 7 to 17% by weight of salts.

Salts present in the water in oil emulsion may be for example sodium salts, lithium salts, potassium salts, magnesium salts, aluminum salts, ammonium salts, phosphate salts, sulfate salts, chloride salts, fluoride salts, citrate salts, acetate salts, tartrate salts, hydrogen phosphate salts, water soluble inorganic salts, other inorganic salts and mixtures thereof. These salts include sodium chloride, sodium sulfate, sodium bromide, calcium chloride, ammonium sulfate, ammonium chloride, lithium chloride, lithium bromide, potassium chloride, potassium bromide, magnesium sulfate, aluminum sulfate, ammonium hydrogen phosphate, sodium hydrogen phosphate, potassium hydrogen phosphate and mixtures thereof. Sodium chloride, calcium chloride ammonium chloride, ammonium sulfate are preferred, and mixtures thereof are further preferred.

Water in Oil Emulsion of Water-Soluble Polymer

The water in oil emulsion according to the invention comprises preferably from 8% to 60% by weight of water-soluble polymer, preferably from 12 to 40%, more preferably from 12 to 30% by weight, even more preferably from 12 to 25% by weight.

The water-soluble polymer may be anionic, nonionic, cationic or amphoteric. The water-soluble polymer may be obtained by polymerization of at least one non-ionic monomer and/or at least one anionic monomer, and/or at least one cationic monomer, and/or at least one zwitterionic monomer.

Non-ionic monomers are preferably selected from the group comprising acrylamide; methacrylamide; N-mono derivatives of acrylamide; N-mono derivatives of methacrylamide; N,N derivatives of acrylamide; N,N derivatives of methacrylamide; acrylic esters; and methacrylic esters. The most preferred non-ionic monomer is acrylamide.

Anionic monomers are preferably selected from the group comprising monomers having a carboxylic function and salts thereof monomers having a sulfonic acid function and salts thereof; monomers having a phosphonic acid function and salts thereof; vinylphosphonic acid. They include for instance acrylic acid, acrylamide tertio butyl sulfonic acid, methacrylic acid, maleic acid, itaconic acid; salts thereof and hemi esters thereof. The most preferred anionic monomers are acrylic acid, acrylamide tertio butyl sulfonic acid (ATBS), and salts thereof. Generally, salts are alkaline salts, alkaline earth salts or ammonium salts.

Cationic monomers are preferably selected from the group comprising dimethylaminoethyl acrylate (DMAEA) quaternized or salified; dimethylaminoethyl methacrylate (DMAEMA) quaternized or salified; diallyldimethyl ammonium chloride (DADMAC); acrylamidopropyltrimethylammonium chloride (APTAC); methacrylamidopropyltrimethylammonium chloride (MAPTAC). Dimethylaminoethyl acrylate (DMAEA) quaternized or salified is preferred.

Monomers having a hydrophobic character may also be used as a co-monomer for the preparation of the water-soluble polymer but at a concentration in weight based on the total monomer content of preferably less than 5%. They are preferably selected from the group comprising (meth) acrylic acid esters having an alkyl, arylalkyl or ethoxylated chain; derivatives of (meth)acrylamide having an alkyl, arylalkyl or dialkyl chain; cationic allyl derivatives; anionic or cationic hydrophobic (meth)acryloyl derivatives; and anionic or cationic monomers derivatives of (meth)acrylamide bearing a hydrophobic chain. Most preferred is methacrylamide bromoalkylated C8-C16.

It is also possible to use a branching agent. Such an agent is, for example, chosen from methylenebisacrylamide (MBA), ethylene glycol diacrylate, tetraallyl ammonium chloridepolyethylene glycol dimethacrylate, diacrylamide, cyanomethyl acrylate, vinyloxyethyl acrylate, vinyloxy methacrylate, triallylamine, formaldehyde, glyoxal, glycidyl ethers such as ethylene glycol diglycidyl ether, and epoxies, and mixtures thereof.

It is also possible to use a free radical chain transfer agent, otherwise known as a chain limiter. The use of a transfer chain agent is particularly advantageous for controlling the molecular weight of the polymer obtained. By way of example of a transfer agent, reference may be made to methanol, isopropanol, sodium hypophosphite, 2-mercaptoethanol and sodium methallyl sulfonate, and mixtures thereof. Those skilled in the art will adjust, in a known manner, the amounts of branching agent, and optionally of transfer agent.

According to the invention, the water-soluble polymer may be post-hydrolysed. Post hydrolysis is a reaction made on the polymer after its polymerization. This step consists of the reaction of hydrolysable functional groups of advantageously nonionic monomers, more preferably amide or ester functions, with a hydrolysis agent. This hydrolysis agent may be an enzyme, an ion exchange resin, or an alkali metal. Preferably, the hydrolysis agent is a Brønsted base. During this post-hydrolysis, the number of carboxylic acid functions increases. Indeed, the reaction between the base and the amide or ester functions present in the polymer produces carboxylate groups.

According to the invention, the water-soluble polymer may have a linear structure, branched, star, comb or a controlled polydispersity in molecular weight. These properties can be obtained by selection at the choice of the initiator, of the transfer agent, of the polymerization technique such as the controlled radical polymerization known as RAFT (reversible chain transfer by addition-fragmentation), NMP (Nitroxide Mediated Polymerization) or ATRP (Atom Transfer Radical Polymerization), the incorporation of structural monomers, the concentration . . . . The general knowledge of the skilled person allows him to prepare a water-soluble polymer having one of these types of structure. The polymers of the invention, when with a specific morphology, remain water soluble.

When the water-soluble polymer is anionic, the anionicity is preferably comprised between 1 to 60 mol %, preferably from 5 to 40 mol %, more preferably from 19 to 31 mol %. When the water-soluble polymer is cationic, the cationicity is preferably comprised between 1 to 100 mol %, preferably from 5 to 60 mol %, more preferably from 10 to 40 mol %, even more preferably from 15 to 30 mol %.

The water-soluble polymer is preferably:

- a copolymer obtained by polymerization of from 80 to 95 mol % of acrylamide and from 5 to 20 mol % of acrylamide tertio butyl sulfonic acid (ATBS) and/or salt(s) thereof, or
- a copolymer obtained by polymerization of from 70 to 85 mol % of acrylamide and from 15 to 30 mol % of dimethylaminoethyl acrylate (DMAEA) quaternized or salified, or
- a copolymer obtained by polymerization of from 69 to 81 mol % of acrylamide and from 19 to 31 mol % of acrylic acid and/or salt(s) thereof.

The water-soluble polymer according to the invention has preferably an average molecular weight by weight comprised between 1 and 30 million g/mol, more preferably between 5 and 30 million g/mol.

The "weight average molecular weight" according to the present invention is determined by the intrinsic viscosity. The intrinsic viscosity can be measured by methods known to the skilled person and especially can be calculated from the values of reduced viscosity for different concentrations by a graphical method consisting of plotting the reduced viscosity values (on the ordinate axis) against the concentrations (on the abscissa axis) and extrapolating the curve to zero concentration. The intrinsic viscosity value is read off the ordinate axis or by using least square method. Then the weight average molecular weight can be determined by the well-known Mark-Houwink equation:

$$[\eta]=KM^{\alpha}$$

$[\eta]$ represents intrinsic viscosity of the polymer determined by solution viscosity measuring method, K represents an empiric constant, M represents molecular weight of the polymer, $\alpha$ represents the Mark-Houwink coefficient $\alpha$ and K, depend on the particular polymer-solvent system The oil used to prepare the water in oil emulsion of the invention may be a mineral oil, a vegetal oil, a synthetic oil or a mixture of several of these oils. Examples of mineral oil are mineral oil containing saturated hydrocarbons of aliphatic, naphtenic, paraffinic, isoparaffinic, cycloparaffinic or naphthyl type. Example of synthetic oil are hydrogenated polydecene or hydrogenated polyisobutene; an ester such as octyl stearate or butyl oleate. Exxsol® products range from Exxon are suitable oil.

In general, the weight ratio of the aqueous phase to the oil phase during the polymerization is preferably from 50/50 to 90/10, more preferably 70/30 to 80/20.

The water in oil emulsion of step a. preferably comprises from 12 to 24% by weight of oil, more preferably from 15 to 22% by weight.

The water in oil emulsion of step a. preferably comprises from 30 to 55% by weight of water, more preferably from 35 to 48% by weight.

The inverting agent is a surfactant having a HLB value greater or equal to 10. By way of example of such inverting agent, reference may be made to ethoxylated sorbitan esters such as sorbitan oleate ethoxylated with 20 equivalents of ethylene oxide (EO 20), sorbitan laurate polyethoxylated with 20 mol of ethylene oxide, castor oil polyethoxylated with 40 mol of ethylene oxide, decaethoxylated oleodecyl alcohol, heptaethoxylated lauryl alcohol, or sorbitan monostearate polyethoxylated with 20 mol of ethylene oxide. Inverting agent may also be polyoxyethylene alkyl phenol; polyoxyethylene (10 mole) cetyl ether;

polyoxyethylene alkyl-aryl ether; quaternary ammonium derivatives; potassium oleate; N-cetyl-N-ethyl morpholinium ethosulfate; sodium lauryl sulfate; condensation products of higher fatty alcohols with ethylene oxide, such as the reaction product of oleyl alcohol with 10 ethylene oxide units; condensation products of alkylphenols and ethylene oxide, such as the reaction products of isooctylphenol with 12 ethylene oxide units; condensation products of higher fatty acid amines with five, or more, ethylene oxide units; ethyleneoxide tristerylphenol; ethylene oxide condensation products of polyhydric alcohol partial higher fatty esters, and their inner anhydrides (e.g., mannitol anhydride, and sorbitol-anhydride); amine oxide; an alkyl polyglucoside; a glucamide; an ester phosphate or an alkylbenzene sulfonic acid salt; hydrosoluble polymeric surfactant.

In a preferred embodiment, the inverting agent is a ethoxylated nonylphenol, preferably having 4 to 10 ethoxylation, an ethoxy/propoxy alcohol, preferably having C12 to C25 ethoxy/propoxylation, or a tridecylic alcohol ethoxylated, or an ethoxy/propoxy fatty alcohol.

The water in oil emulsion may contain at least two inverting agents, preferably at least three inverting agents, even more preferably at least four inverting agents.

The emulsifying agent is a surfactant having a HLB value inferior to 10. By way of example of such emulsifying agent, reference may be made to surfactant polymers such as polyesters having a molecular weight of between 1000 and 3000, products of condensation between a poly(isobutenyl) succinic acid or the anhydride thereof and a polyethylene glycol, block copolymers having a molecular weight of between 2500 and 3500, for example those sold under the Hypermer® names, sorbitan extracts, for instance sorbitan monooleate, sorbitan isostearate or sorbitan sesquioleate, polyethoxylated sorbitan esters, or else diethoxylated oleocetyl alcohol or tetraethoxylated lauryl acrylate, condensation products of higher fatty alcohols with ethylene oxide, such as the reaction product of oleyl alcohol with 2 ethylene oxide units; condensation products of alkylphenols and ethylene oxide, such as the reaction product of nonyl phenol with 4 ethylene oxide units. Products like Witcamide® 511, betaine products and ethoxylated amine are also good candidates as emulsifying agents.

In a preferred embodiment, the emulsifying agent is a sorbitan monoleate, polyethoxylated sorbitan esters or tall oil fatty acid diethanolamine.

The water in oil emulsion may contain at least two emulsifying agents, preferably at least three emulsifying agents even more preferably at least four emulsifying agents.

At the end of the polymerization reaction, it is also possible for the emulsion obtained to be diluted or concentrated. A dilution is generally made by adding water in the water in oil emulsion. It is possible to concentrate the obtained emulsion, for instance by distillation.

In the context of the invention, the water in oil emulsion of step a. preferably contains from 0.5% to 10% by weight of emulsifying agent, and from 0.5% to 16% by weight of inverting agent, more preferably from 0.6 to 16% of inverting agent. And in any case, the mass ratio R is superior to 1.2.

The water in oil emulsion of step a. preferably comprises from 0.8 to 2% by weight of at least one emulsifying agent, preferably from 1 to 2%.

The water in oil emulsion of step a. preferably comprises from 0.5 to 6% by weight of at least one inverting agent, more preferably from 0.6 to 6%, even more preferably from 1 to 6%, even more preferably from 2 to 6%, and even more preferably from 3 to 6%.

As said earlier, the selection of the ratio R is also important depending of the water in oil emulsion composition. It has been found surprisingly that the performances of the polymer of the water in oil emulsion are further improved when the ratio R is selected according to the invention, and when the water in oil emulsion contains salts.

As already mentioned, the water in oil emulsion preferably comprises from 1 to 40% by weight of salts, more preferably from 3 to 30% by weight, even more preferably from 5 to 25% by weight, and even more preferably from 7 to 17% by weight of salts.

The water in oil emulsion can be prepared according to any process known by the person skilled in the art. Generally, an aqueous solution comprising the monomer(s) and the emulsifying agent(s) is emulsified in an oil phase. Then, the polymerization is made by adding a free radical initiator. Reference may be made to redox couples, with cumene hydroperoxide, tertiary butylhydroxyperoxide or persulfates among the oxidizing agents, sodium sulfite, sodium metabisulfite and the Mohr salt among the reducing agents. Azo compounds such as 2,2'-azobis(isobutyronitrile) and 2,2'-azobis(2-amidinopropane) hydrochloride can also be used.

Conventionally, the polymerization is generally carried out isothermally, adiabatically or at controlled temperature. That is to say the temperature is kept constant, generally between 10 and 60° C. (isotherm), or else the temperature is left to increase naturally (adiabatic) and in this case the reaction is generally begun at a temperature below 10° C. and the final temperature is generally above 50° C., or, finally, the temperature increase is controlled so as to have a temperature curve between the isotherm curve and the adiabatic curve.

Generally, the inverting agent(s) is/are added at the end of the polymerization reaction, preferably at a temperature below 50° C.

In a very preferred embodiment of the invention the mass ratio R is superior to 2, preferably to 2.5, even more preferably to 3, and the aqueous fluid of step b. is a brine comprising more than 30.000 ppm of salts, preferably more than 70.000 ppm, even more preferably more than 100.000 ppm, and the water in oil emulsion comprises from 1 to 40% by weight of salts, preferably from 3 to 30% by weight, more preferably from 5 to 25% by weight, even more preferably from 7 to 17% by weight of salts.

In a very preferred embodiment of the invention, the water in oil emulsion comprises:

from 12 to 25% by weight of water-soluble polymer;

from 7 to 17% by weight of salts, preferably any one or more of sodium chloride, ammonium chloride and ammonium sulfate;

from 0.8 to 2% by weight of at least one emulsifying agent, preferably at least two emulsifying agents;

from 3 to 6% by weight of at least one inverting agent, preferably at least two inverting agents;

from 12 to 24% by weight, preferably from 15 to 22% by weight of oil;

from 30 to 55% by weight, preferably from 35 to 48% by weight of water;

the total amount being 100% by weight.

In an even more preferred embodiment of the invention, the water in oil emulsion comprises:

from 12 to 25% by weight of water-soluble polymer;

from 7 to 17% by weight of salts, preferably any one or more of sodium chloride, ammonium chloride and ammonium sulfate;

from 0.8 to 2% by weight of at least one emulsifying agent, preferably at least two emulsifying agents;

from 3 to 6% by weight of at least one inverting agent, preferably at least two inverting agents;

from 12 to 24% by weight, preferably from 15 to 22% by weight of oil;

from 30 to 55% by weight, preferably from 35 to 48% by weight of water;

the total amount being 100% by weight;

wherein the water-soluble polymer is either a copolymer obtained by polymerization of from 80 to 95 mol % of acrylamide and from 5 to 20 mol % of acrylamide tertio butyl sulfonic acid (ATBS) and/or salt(s) thereof, or a copolymer obtained by polymerization of from 70 to 85 mol % of acrylamide and from 15 to 30 mol % of dimethylaminoethyl acrylate (DMAEA) quaternized or salified, or a copolymer obtained by polymerization of from 69 to 81 mol % of acrylamide and from 19 to 31 mol % of acrylic acid and/or salt(s) thereof.

Method of Use

In the method of the invention, the injection fluid is made by adding at least the water in oil emulsion of the invention in water or brine. The water-soluble polymer is released and dissolved in the injection fluid. The injection fluid comprises the water-soluble polymer in an amount of preferably from 0.0005% by weight to 1% by weight. The amount of water-soluble polymer varies depending of the oil and gas recovery process, the conditions in the subterranean formation (for example salinity and/or temperature), and the expected results.

The injection fluid may also comprise other components such as alkaline agent, surfactant, proppant, biocides, corrosion inhibitor, acids, scale inhibitors, clay swelling inhibitor, guar, guar derivatives, crosslinkers such as zirconium, titanate or borate compounds depending of the nature of the recovery process of oil and gas.

The method of the invention may be any subterranean treatment where a water-soluble polymer is used to increase the viscosity of the aqueous injection fluid and/or to reduce the level of frictional resistance that occurs during the injection of said fluid in a subterranean formation. Such subterranean treatments include, but are not limited to, drilling operations, stimulation treatments such as fracturing operations, completion operations and enhanced oil recovery process by polymer flooding.

The water in oil emulsion of the invention is particularly useful in fracturing operations, and in enhanced oil recovery processes by polymer flooding.

The present invention also provides a fracturing method comprising:

a. Providing a water in oil emulsion of a water-soluble polymer, said emulsion comprising at least an inverting agent, and at least an emulsifying agent, wherein the mass ratio R of the total amount of inverting agent to the total amount of emulsifying agent is superior to 1.2;
b. Inverting the water in oil emulsion by adding it into an aqueous fluid to form an injection fluid;
c. Optionally, adding at least a proppant into the injection fluid;
d. Introducing the injection fluid into portion of the subterranean formation;
e. Fracturing portion of the subterranean formation with the injection fluid;
f. Recovering a mixture of gas, oil and aqueous fluid.

The present invention also provides an enhanced oil recovery process by polymer flooding comprising:

a. Providing a water in oil emulsion of a water-soluble polymer, said emulsion comprising at least an inverting agent, and at least an emulsifying agent, wherein the mass ratio R of the total amount of inverting agent to the total amount of emulsifying agent is superior to 1.2;
b. Inverting the water in oil emulsion by adding it into an aqueous fluid to form an injection fluid;
c. Introducing the injection fluid into portion of the subterranean formation;
d. Flooding portion of the subterranean formation with the injection fluid;
e. Recovering a mixture of oil, gas and aqueous fluid.

The emulsion of the invention may be advantageously made down with the device and method of the document U.S. Pat. No. 8,383,560 where the emulsion is continuously dissolved with a multiple static mixer arrangement.

The present invention also provides a water treatment process comprising providing a water in oil emulsion of a water-soluble polymer, said emulsion comprising at least an inverting agent, and at least an emulsifying agent, wherein the mass ratio R of the total amount of inverting agent to the total amount of emulsifying agent is superior to 1.2; inverting the water in oil emulsion by adding it into an aqueous fluid to form a fluid, and treating the water to be treated with said fluid. Water to be treated includes municipal water treatment and industrial waste water treatment.

The present invention also provides sludge and mineral waste treatment process comprising providing a water in oil emulsion of a water-soluble polymer, said emulsion comprising at least an inverting agent, and at least an emulsifying agent, wherein the mass ratio R of the total amount of inverting agent to the total amount of emulsifying agent is superior to 1.2; inverting the water in oil emulsion by adding it into an aqueous fluid to form a fluid, and treating the sludge or the mineral waste with said fluid. Sludge and mineral waste treatment include the treatment of sludge, tailings from the mineral industry and coal industry.

The present invention also provides a process to transport aqueous fluid comprising providing a water in oil emulsion of a water-soluble polymer, said emulsion comprising at least an inverting agent, and at least an emulsifying agent, wherein the mass ratio R of the total amount of inverting agent to the total amount of emulsifying agent is superior to 1.2; inverting the water in oil emulsion by adding it into an aqueous fluid to form a fluid, and treating the aqueous fluid with said fluid. Aqueous fluid includes water transportation in pipeline, aqueous suspension of solid particles, such as waste or mineral waste or sludge transportation in pipeline.

The present invention will further be described by reference to the following examples. The following examples are merely illustrative of the invention and are not intended to be limiting. Unless otherwise indicated, all percentages are by weight (w %).

EXAMPLES

Preparation of Water in Oil Emulsions

The respective amounts of the components of water-in-oil emulsions according to examples 1-33 are given in weight percentage as compared to the weight of the emulsions.

Example 1 (Counter Example)—Water-in-Oil 30% Active Polymer

An aqueous phase is prepared with 50.81% by weight of an acrylamide solution (50% by weight of concentration), 4.54 w % of acrylic acid, 9.63 w % of a 25% solution of NaOH, 10.55 w % of deionized water, and 0.02 w % of Versenex 80.

An oil phase is prepared with an oil (Exxsol® D100 S) in an amount of 20.72 w %, and the following emulsifying agents; 1.16 w % of Witcamide®511 (Tall oil fatty acid diethanolamine), 0.16 w % of Span® 80 (Sorbitan monooleate), and 0.23 w % of Tween® 81 (Sorbitan Monooleate 5EO).

The aqueous phase is added to the oil phase with mixing to form an emulsion. The resulting emulsion is sparged with nitrogen for 30 minutes while the temperature was equilibrated to 25° C., at which time 0.002 w % of peroxide is added to the emulsion and 0.75 w % of sodium metabisulfite (SMBS) solution (0.05% w) is fed to the dispersion at a rate of 0.1 milliliters per minute. The polymerization temperature is controlled between 38° C. and 42° C. for approximately 90 minutes. Residual monomers are scavenged by feeding 0.248 w % sodium metabisulfite (SMBS) (0.05% w) solution at a rate of 1.0 milliliters per minute. A water-in-oil polymer emulsion is obtained that contains 30% of active copolymer of acrylamide and sodium acrylate.

1.18 w % of an inverting agent (Plurafac® LF400, an EO/PO fatty alcohol) is added into the water-in-oil polymer emulsion to aid in make-down on use. The mass ratio R is 1.06.

Example 2 (Counter Example)—15% Active Polymer

An aqueous phase is prepared with 22.45% by weight of an acrylamide solution (50% by weight of concentration), 3.35 w % of acrylic acid, 7.15 w % of a 25% solution of NaOH, 44.63 w % of deionized water, and 0.02 w % of Versenex 80.

An oil phase is prepared with an oil (Exxsol® D100 S) in an amount of 18.73 w %, and the following emulsifying agents; 1.16 w % of Witcamide®511 (Tall oil fatty acid diethanolamine), 0.16 w % of Span® 80 (Sorbitan monooleate), and 0.23 w % of Tween® 81 (Sorbitan Monooleate 5EO).

The aqueous phase is added to the oil phase with mixing to form an emulsion. The resulting emulsion is sparged with nitrogen for 30 minutes while the temperature was equilibrated to 25° C., at which time 0.002 w % of peroxide is added to the emulsion and 0.75 w % sodium metabisulfite (SMBS) solution (0.05 w %) is fed to the dispersion at a rate of 0.1 milliliters per minute. The polymerization temperature is controlled between 38° C. and 42° C. for approximately 90 minutes. Residual monomers are scavenged by feeding 0.318 w % sodium metabisulfite (SMBS) solution (0.05 w %) at a rate of 1.0 milliliters per minute. A water-in-oil polymer emulsion is obtained that contains 15% of active copolymer of acrylamide and sodium acrylate.

1.05 w % of an inverting agent (Plurafac® LF400, an EO/PO fatty alcohol) is added into the water-in-oil polymer emulsion to aid in make-down on use. The mass ratio R is 1.06.

Example 3 (Counter Example)—30% Active Polymer

The same water-in-oil is made as in Counter-example 1, except that the inverting agent is not Plurafac® LF400, but Marlophen® NP 8, Nonylphenol polyethylene glycol ethers (8 EO).

Example 4 (Counter Example)—15% Active Polymer

The same water-in-oil is made as in Counter-example 2, except that the inverting agent is not Plurafac® LF400, but Marlophen® NP 8, Nonylphenol polyethylene glycol ethers (8 EO).

The following examples are prepared with a mass ratio R according to the invention. Examples 5 to 11 according to the invention are prepared according to the same process as example 1 except that greater amounts of Plurafac® LF400 are added as inverting agent. Examples 12 to 17 are prepared according to the same process as example 2 except that greater amounts of Plurafac® LF400 are added. Examples 18 to 25 are prepared according to the same process as example 3 except that greater amounts of Marlophen® NP 8 are added. Examples 26 to 33 are prepared according to the same process as example 4 except that greater amount of Marlophen® NP 8 are added. Table 1 discloses the mass ratio R of all the examples 1-33.

TABLE 1

Mass Ratio R of water-in-oil emulsion

| Example | Mass ratio R | Active polymer (w %) | Inverting agent added at various level |
|---|---|---|---|
| 1 | 1.06 | 30 | Plurafac ® LF400 |
| 5 | 1.5 | | |
| 6 | 2.25 | | |
| 7 | 2.7 | | |
| 8 | 3 | | |
| 9 | 3.75 | | |
| 10 | 4.5 | | |
| 11 | 6 | | |
| 2 | 1.06 | 15 | |
| 12 | 1.5 | | |
| 13 | 2.25 | | |
| 14 | 2.7 | | |
| 15 | 3 | | |
| 16 | 3.75 | | |
| 17 | 4.5 | | |

TABLE 1-continued

| Mass Ratio R of water-in-oil emulsion | | | |
|---|---|---|---|
| Example | Mass ratio R | Active polymer (w %) | Inverting agent added at various level |
| 3 | 1.06 | 30 | Marlophen ® NP 8 |
| 18 | 1.5 | | |
| 19 | 2 | | |
| 20 | 2.4 | | |
| 21 | 2.9 | | |
| 22 | 3.4 | | |
| 23 | 3.9 | | |
| 24 | 4.2 | | |
| 25 | 4.6 | | |
| 4 | 1.06 | 15 | |
| 26 | 1.5 | | |
| 27 | 2 | | |
| 28 | 2.4 | | |
| 29 | 2.9 | | |
| 30 | 3.4 | | |
| 31 | 3.9 | | |
| 32 | 4.2 | | |
| 33 | 4.6 | | |

Friction Flow Loop Testing

A friction flow loop was constructed from ¼" (1"=2.54 cm) outer diameter stainless steel tubing, 20 feet in overall length. Test solutions are pumped out of the bottom of a tapered 5 liter reservoir. The solution flows through the tubing and is returned back into the reservoir. The flow is achieved using a triplex pump equipped with a variable speed drive.

4 liters of fresh water or brine (for instance synthetic brine or sea water) is prepared in the sample reservoir and the pump is started and set to deliver a flow rate of 1.5 gal/min (1 US gal=3,785 41 liters). The salt solution is recirculated until the temperature equilibrates at 25° C. and a stabilized pressure differential is achieved. This pressure is recorded as the “initial pressure” of the fresh water or sea water or brine.

The test amount of neat water-in-oil emulsion polymer is quickly injected with a syringe into the sample reservoir containing the fresh water or sea water or brine and a timer is started. The dose is recorded as gallons of water-in-oil emulsion per thousand gallons of fresh water or sea water or brine (gpt). The pressure is recorded every second during 5 minutes. The percentage friction reduction (% FRt) at a given time ‘t’ is calculated from the initial pressure drop ΔPi and the pressure drop at time t, ΔPt using the equation:

$$\% FR_t = \frac{\Delta P_i - \Delta P_t}{\Delta P_i} \times 100$$

The sea water of the examples comprises water and 3 wt % NaCl 0.3 wt % $CaCl_2$.

Results

The results for water-in-oil emulsions at 30 w % active polymer with Plurafac® LF400 are shown in table 2. The dose is the amount of water-in-oil emulsion used as gallons per thousand gallons and the active dose is the amount of polymer used as weight percent of fresh water or sea water or 7 w % NaCl brine.

TABLE 2

| Friction reduction depending on the water-in-oil emulsion | | | | | | | |
|---|---|---|---|---|---|---|---|
| Ex. | Mass Ratio R | Max. FR in Fresh Water (%) | Time to Max. FR in Fresh Water (seconds) | Max. FR in Sea Water (%) | Time to Max. FR in Sea Water (seconds) | Max. FR in 7% NaCl Brine (%) | Time to Max. FR in 7% NaCl Brine (seconds) |
| 1 | 1.06 | 49.21 | 82 | 20.61 | 164 | 16.97 | 300 |
| 5 | 1.5 | 51.58 | 39 | 23.98 | 120 | 21.01 | 266 |
| 6 | 2.25 | 51.07 | 39 | 34.16 | 57 | 24.32 | 289 |
| 7 | 2.7 | 50.74 | 39 | 49.63 | 52 | 26.76 | 297 |
| 8 | 3 | 51.54 | 18 | 52.70 | 35 | 32.94 | 300 |
| 9 | 3.75 | 51.65 | 15 | 52.46 | 20 | 34.31 | 300 |
| 10 | 4.5 | 51.54 | 15 | 52.18 | 38 | 46.39 | 298 |
| 11 | 6 | 51.77 | 11 | 52.36 | 15 | 48.71 | 24 |

The results for water-in-oil emulsions at 15 w % active polymer with Plurafac® LF400 are shown in table 3. The dose is the amount of water-in-oil emulsion used as gallons per thousand gallons and the active dose is the amount of polymer used as weight percent of fresh water or sea water or 7 w % NaCl brine.

TABLE 3

| Friction reduction depending on the water-in-oil emulsion | | | | | | | |
|---|---|---|---|---|---|---|---|
| Ex. | Mass Ratio R | Max. FR in Fresh Water (%) | Time to Max. FR in Fresh Water (seconds) | Max. FR in Sea Water (%) | Time to Max. FR in Sea Water (seconds) | Max. FR in 7% NaCl Brine (%) | Time to Max. FR in 7% NaCl Brine (seconds) |
| 2 | 1.06 | 47.42 | 61 | 3.06 | 300 | 1.87 | 300 |
| 12 | 1.5 | 53.05 | 30 | 3.78 | 300 | 2.47 | 176 |
| 13 | 2.25 | 53.06 | 27 | 4.98 | 298 | 3.14 | 264 |
| 14 | 2.7 | 52.96 | 55 | 45.46 | 13 | 8.30 | 298 |
| 15 | 3 | 52.91 | 55 | 52.31 | 11 | 10.26 | 298 |
| 16 | 3.75 | 52.83 | 41 | 52.40 | 29 | 18.96 | 298 |
| 17 | 4.5 | 53.06 | 41 | 52.85 | 37 | 48.11 | 22 |

The results for water-in-oil emulsions at 30 w % active polymer with Marlophen® NP 8 are shown in table 4. The dose is the amount of water-in-oil emulsion used as gallons per thousand gallons and the active dose is the amount of polymer used as weight percent of fresh water or sea water, 7 w % NaCl brine, 9% $CaCl_2$ brine, API brine (8.5 w % NaCl+2.5 w % $CaCl_2$) and 2×API brine (17 w % NaCl+5 w % $CaCl_2$).

TABLE 4

Friction reduction depending on the water-in-oil emulsion

| Ex. | Mass Ratio R | Max. FR in Fresh Water (%) | Time to Max. FR in Fresh Water (seconds) | Max. FR in Sea Water (%) | Time to Max. FR in Sea Water (seconds) | Max. FR in 7% NaCl Brine (%) | Time to Max. FR in 7% NaCl Brine (seconds) |
|---|---|---|---|---|---|---|---|
| 3 | 1.06 | 48.31 | 67 | 16.55 | 238 | 12.76 | 300 |
| 18 | 1.5 | 51.64 | 24 | 37.80 | 93 | 25.32 | 243 |
| 19 | 2 | 51.17 | 31 | 50.53 | 45 | 29.47 | 217 |
| 20 | 2.4 | 51.68 | 19 | 52.68 | 44 | 34.64 | 198 |
| 21 | 2.9 | 51.76 | 16 | 52.46 | 33 | 49.87 | 29 |
| 22 | 3.4 | 51.90 | 17 | 52.73 | 26 | 50.23 | 27 |
| 23 | 3.9 | 52.17 | 12 | 52.22 | 27 | 51.44 | 16 |
| 24 | 4.2 | 52.41 | 9 | 52.97 | 18 | 51.56 | 11 |
| 25 | 4.6 | 52.25 | 7 | 52.47 | 13 | 51.75 | 12 |

| Ex. | Mass Ratio R | Max. FR in 9% CaCl2 (%) | Time to Max. FR in 9% CaC12 (seconds) | Max. FR in API Brine (%) | Time to Max. FR in API Brine (seconds) | Max. FR in 2xAPI Brine (%) | Time to Max. FR in 2xAPI Brine (seconds) |
|---|---|---|---|---|---|---|---|
| 3 | 1.06 | 11.87 | 300 | 9.81 | 300 | 4.24 | 300 |
| 18 | 1.5 | 22.48 | 300 | 9.78 | 300 | 5.08 | 300 |
| 19 | 2 | 23.78 | 300 | 10.01 | 300 | 6.52 | 300 |
| 20 | 2.4 | 24.11 | 295 | 9.42 | 300 | 9.96 | 300 |
| 21 | 2.9 | 29.17 | 244 | 13.54 | 300 | 11.71 | 300 |
| 22 | 3.4 | 35.35 | 188 | 17.78 | 267 | 19.46 | 277 |
| 23 | 3.9 | 50.26 | 46 | 29.45 | 142 | 26.28 | 243 |
| 24 | 4.2 | 50.82 | 17 | 47.97 | 35 | 39.39 | 160 |
| 25 | 4.6 | 50.21 | 12 | 50.54 | 28 | 49.67 | 42 |

The results for water-in-oil emulsions at 15 w % active polymer with Marlophen® NP 8 are shown in table 5. The dose is the amount of water-in-oil emulsion used as gallons per thousand gallons and the active dose is the amount of polymer used as weight percent of fresh water or sea water, 7 w % NaCl brine, 9% $CaCl_2$ brine, and API brine.

TABLE 5

Friction reduction depending on the water-in-oil emulsion

| Ex. | Mass Ratio R | Max. FR in Fresh Water (%) | Time to Max. FR in Fresh Water (seconds) | Max. FR in Sea Water (%) | Time to Max. FR in Sea Water (seconds) | Max. FR in 7% NaCl Brine (%) | Time to Max. FR in 7% NaCl Brine (seconds) |
|---|---|---|---|---|---|---|---|
| 4 | 1.06 | 47.22 | 51 | 4.99 | 295 | 2.84 | 300 |
| 26 | 1.5 | 52.30 | 20 | 5.65 | 299 | 4.21 | 287 |
| 27 | 2 | 53.36 | 17 | 48.96 | 39 | 24.97 | 147 |
| 28 | 2.4 | 53.61 | 17 | 50.21 | 33 | 49.72 | 49 |
| 29 | 2.9 | 53.96 | 14 | 52.86 | 30 | 50.07 | 41 |
| 30 | 3.4 | 53.18 | 11 | 51.29 | 24 | 50.79 | 36 |
| 31 | 3.9 | 52.94 | 13 | 49.25 | 26 | 51.25 | 25 |
| 32 | 4.2 | 53.08 | 15 | 52.47 | 21 | 51.06 | 14 |
| 33 | 4.6 | 53.39 | 15 | 52.04 | 25 | 51.19 | 11 |

| Ex. | Mass Ratio R | Max. FR in 9% $CaCl_2$ (%) | Time to Max. FR in 9% $CaCl_2$ (seconds) | Max. FR in API Brine (%) | Time to Max. FR in API Brine (seconds) | Max. FR in 2xAPI Brine (%) | Time to Max. FR in 2xAPI Brine (seconds) |
|---|---|---|---|---|---|---|---|
| 4 | 1.06 | 2.75 | 300 | 1.86 | 300 | 1.92 | 300 |
| 26 | 1.5 | 6.44 | 300 | 7.88 | 300 | 3.45 | 300 |
| 27 | 2 | 12.75 | 273 | 8.22 | 300 | 5.30 | 300 |
| 28 | 2.4 | 22.94 | 222 | 13.67 | 276 | 8.64 | 300 |
| 29 | 2.9 | 32.78 | 201 | 21.40 | 265 | 11.29 | 300 |
| 30 | 3.4 | 49.74 | 42 | 33.69 | 182 | 17.80 | 300 |
| 31 | 3.9 | 50.21 | 35 | 48.90 | 40 | 24.50 | 221 |
| 32 | 4.2 | 49.98 | 28 | 49.44 | 36 | 38.56 | 145 |
| 33 | 4.6 | 50.35 | 27 | 50.47 | 24 | 47.78 | 29 |

The results show that the friction reducing performances are improved when the mass ratio R (total amount of inverting agent to the total amount of emulsifying agent) increases. When the salt concentrations increase, the friction reduction performances decrease. However, when the mass ratio R is chosen and adapted according to the range of the invention, it becomes possible to obtain very good friction performances even in brines and high brines. In contrast, water-in-oil emulsions of the prior art (Examples 1 to 4) are very limited and do not offer good friction performances in brines.

The invention claimed is:

1. A method of treating a portion of subterranean formation, comprising:

a. Providing a water in oil emulsion of at least one water-soluble polymer, said emulsion comprising at least one inverting agent having an HLB greater than or equal to 10, and at least one emulsifying agent having an HLB less than 10, wherein the mass ratio R of the total amount of inverting agent to the total amount of emulsifying agent is greater than 1.2 wherein the water in oil emulsion contains from 0.5% to 6% by weight of inverting agent;

b. Inverting the water in oil emulsion by adding it into an aqueous fluid to form an injection fluid; and c. Introducing the injection fluid into a portion of the subterranean formation.

2. The method according to claim 1, wherein the mass ratio R is greater than 1.5.

3. The method according to claim 1, wherein when the aqueous fluid of step b. is fresh water or a brine comprising up to 30,000 ppm of salts, R ratio is above 1.2, when the aqueous fluid of step b. is a brine comprising from 30,000 ppm to 70,000 ppm of salts, R ratio is above 1.8, when the aqueous fluid of step b. is a brine comprising from 70,000 ppm to 100,000 ppm, R ratio is above 2, when the aqueous fluid of step b. is a brine comprising from 100,000 ppm to 150,000 ppm of salts, R ratio is above 2.5, when the aqueous fluid of step b. is a brine comprising from 150,000 ppm to 200,000 ppm of salts, R ratio is above 3, when the aqueous fluid of step b. is a brine comprising from 200,000 ppm to 250,000 ppm of salts, R ratio is above 3.5, and when the aqueous fluid of step b. is a brine comprising more than 250,000 ppm of salts, R ratio is above 4.

4. The method according to claim 1, wherein when the aqueous fluid of step b. is fresh water or a brine comprising up to 30,000 ppm of salts, R ratio is above 2.5, when the aqueous fluid of step b. is a brine comprising from more than 30,000 ppm to 70,000 ppm of salts, R ratio is above 3, when the aqueous fluid of step b. is a brine comprising from more than 70,000 ppm to 100,000 ppm, R ratio is above 3.5, when the aqueous fluid of step b. is a brine comprising from more than 100,000 ppm to 150,000 ppm of salts, R ratio is above 4, when the aqueous fluid of step b. is a brine comprising from more than 150,000 ppm to 200,000 ppm of salts, R ratio is above 4.2, when the aqueous fluid of step b. is a brine comprising from more than 200,000 ppm to 250,000 ppm of salts, R ratio is above 4.5, and when the aqueous fluid of step b. is a brine comprising more than 250,000 ppm of salts, R ratio is above 5.

5. The method according to claim 1, wherein the water in oil emulsion comprises from 1 to 40% by weight of salts.

6. The method according to claim 1, wherein the water in oil emulsion comprises at least one salt selected from the group consisting of sodium salts, lithium salts, potassium salts, magnesium salts, aluminum salts, ammonium salts, phosphate salts, sulfate salts, chloride salts, fluoride salts, citrate salts, acetate salts, tartrate salts, hydrogen phosphate salts, water soluble inorganic salts, other inorganic salts and mixtures thereof.

7. The method according to claim 1, wherein the water in oil emulsion comprises from 8% to 60% by weight of water-soluble polymer.

8. The method according to claim 1, wherein the inverting agent is selected from the group consisting of an ethoxylated nonylphenol; an ethoxy/propoxy alcohol; a tridecylic alcohol ethoxylated; and an ethoxy/propoxy fatty alcohol.

9. The method according to claim 1, wherein the emulsifying agent is selected from the group consisting of a sorbitan monoleate, polyethoxylated sorbitan esters and tall oil fatty acid diethanolamine.

10. The method according to claim 1, wherein the water in oil emulsion contains from 0.8 to 2% by weight of at least one emulsifying agent, and from 0.6 to 6% by weight of at least one inverting agent.

11. The method according to claim 1, wherein the water-soluble polymer is obtained by polymerization of at least one non-ionic monomer selected from the group consisting of acrylamide; methacrylamide; N-mono derivatives of acrylamide; N-mono derivatives of methacrylamide; N,N derivatives of acrylamide; N,N derivatives of methacrylamide; acrylic esters; and methacrylic esters.

12. The method according to claim 1, wherein the water-soluble polymer is obtained by polymerization of at least one anionic monomer selected from the group consisting of acrylic acid, acrylamide tertio butyl sulfonic acid, methacrylic acid, maleic acid, itaconic acid, salts thereof and hemi esters thereof.

13. The method according to claim 1, wherein the water-soluble polymer is obtained by polymerization of at least one cationic monomer selected from the group comprising dimethylaminoethyl acrylate (DMAEA) quaternized or salified; dimethylaminoethyl methacrylate (DMAEMA) quaternized or salified; diallyldimethyl ammonium chloride (DADMAC); acrylamidopropyltrimethylammonium chloride (APTAC); and methacrylamidopropyltrimethylammonium chloride (MAPTAC).

14. The method according to claim 1, wherein the water-soluble polymer is either an anionic polymer having an anionicity of 1 to 60 mol %, or a cationic polymer having a cationicity of 1 to 100 mol %.

15. The method according to claim 1, wherein the water in oil emulsion consists of:

from 12 to 25% by weight of water-soluble polymer;

from 7 to 17% by weight of salts;

from 0.8 to 2% by weight of at least one emulsifying agent;

from 3 to 6% by weight of at least one inverting agent;

from 12 to 24% by weight of oil;

from 30 to 55% by weight of water;

the total amount being 100% by weight.

16. The method according to claim 1, wherein the water-soluble polymer is a copolymer obtained by polymerization of from 80 to 95 mol % of acrylamide and from 5 to 20 mol % of acrylamide tertio butyl sulfonic acid (ATB S) and/or salts thereof, or a copolymer obtained by polymerization of from 70 to 85 mol % of acrylamide and from 15 to 30 mol % of dimethylaminoethyl acrylate (DMAEA) quaternized or salified, or a copolymer obtained by polymerization of from 69 to 81 mol % of acrylamide and from 19 to 31 mol % of acrylic acid and/or salts thereof.

17. The method according to claim 1, said method further comprising:

d. Optionally adding at least a proppant into the injection fluid between steps b/ and c/;

e. Fracturing a portion of the subterranean formation with the injection fluid; and f Recovering a mixture of gas, oil and aqueous fluid.

18. The method according to claim 1, said method further comprising:

d. Flooding a portion of the subterranean formation with the injection fluid; and e. Recovering a mixture of oil, gas and aqueous fluid.

19. The method according to claim 11, wherein the at least one non-ionic monomer comprises acrylamide.

20. The method according to claim 1, wherein:

the water in oil emulsion comprises:

from 5 to 25% by weight of salts comprising one or more of sodium chloride, ammonium chloride and ammonium sulfate;

from 12% to 40% by weight of water-soluble polymer;

12 to 24% by weight of oil; and 30 to 55% by weight of water;

the inverting agent is selected from the group consisting of an ethoxylated nonylphenol having 4 to 10 ethoxylation; an ethoxy/propoxy alcohol having C12 to C25 ethoxy/propoxylation; a tridecylic alcohol ethoxylated; and an ethoxy/propoxy fatty alcohol; and the water-soluble polymer is obtained by polymerization of monomers, wherein said monomers comprise acrylamide, and wherein said water-soluble polymer is either an anionic polymer having an anionicity of 5 to 40 mol % or a cationic polymer having a cationicity of 5 to 60 mol %.

* * * * *